WILLIAM H. GOSS, OF BOSTON, MASSACHUSETTS.

Letters Patent No. 91,621, dated June 22, 1869.

IMPROVED BEVERAGE.

The Schedule referred to in these Letters Patent and making part of the same.

*To all whom it may concern:*

Be it known that I, WILLIAM H. GOSS, of Boston, in the county of Suffolk, and State of Massachusetts, have invented an Improved Effervescent Beverage; and I hereby declare that the following is a full, clear, and exact description thereof.

My invention has for its object to produce an agreeable, healthful, effervescent beverage; and consists in a beer composed of various ingredients, mixed and prepared in a manner which I will now proceed to describe.

I mix three-quarters (¾) of a pound of tamarinds, and one-quarter (¼) of a pound of prunes, in one (1) gallon of water, and place the mixture over a fire till it is brought to a boiling-point, after which it is strained through a cloth or sieve, to remove the skins, stems, and seeds therefrom.

I now add one (1) gill of maple-sirup, and two (2) teaspoonfuls of essence of Jamaica ginger to the strained mixture, and when it is about lukewarm, I add one (1) gill of lively yeast, after which the mixture must be kept in a warm place for a period of about eight (8) hours.

Finally, skim off the surface of the liquor, and it is ready to be put up in bottles or barrels, as desired.

The proportions of the above-enumerated ingredients may be varied to suit the taste and requirements of the case.

The beverage or drink produced by the admixture and preparation of the ingredients above described, possesses a peculiarly pleasant flavor, and is very refreshing and stimulating, and when kept cool, in warm weather, will not deteriorate for a considerable length of time.

Claim.

What I claim as my invention, and desire to secure by Letters Patent, is—

The within-described effervescent beverage, made of the ingredients set forth, mixed and prepared substantially as described.

WILLIAM H. GOSS.

Witnesses:
N. W. STEARNS,
L. E. BATCHELLER.